United States Patent [19]

Kobayashi et al.

[11] Patent Number: 4,673,193
[45] Date of Patent: Jun. 16, 1987

[54] VEHICLE SUSPENSION APPARATUS

[75] Inventors: Kazuyoshi Kobayashi, Oobu; Shozo Takizawa, Okazaki; Tadao Tanaka, Okazaki; Mitsuhiko Harara, Okazaki; Yasutaka Taniguchi; Masanaga Suzumura, both of Nagoya; Naotake Kumagai, Aichi; Minoru Tatemoto, Okazaki, all of Japan

[73] Assignee: Mitsubishi Jidosha Kogyo Kabushiki Kaisha, Tokyo, Japan

[21] Appl. No.: 735,447

[22] Filed: May 17, 1985

[30] Foreign Application Priority Data

| May 22, 1984 | [JP] | Japan | 59-74691[U] |
| May 22, 1984 | [JP] | Japan | 59-74694[U] |
| Dec. 25, 1984 | [JP] | Japan | 59-201447[U] |
| Dec. 25, 1984 | [JP] | Japan | 59-201451[U] |
| Jul. 25, 1985 | [JP] | Japan | 60-112664[U] |

[51] Int. Cl.$^4$ .......................................... B60G 21/06
[52] U.S. Cl. ................................................ 280/707
[58] Field of Search ................... 280/707, 714, 6.0 R, 280/6.1, 703, DIG. 1; 180/41

[56] References Cited

U.S. PATENT DOCUMENTS

| 2,921,160 | 1/1960 | Lautzenhiser | 280/707 |
| 2,988,279 | 6/1961 | Irwin | 137/599 |
| 3,081,942 | 3/1963 | Maclay | 91/31 |
| 3,130,688 | 4/1964 | Gutridge | 280/6 R |
| 3,156,481 | 11/1964 | Dangauthier | 280/6 R |
| 3,608,925 | 9/1971 | Murphy | 280/707 |
| 3,643,970 | 2/1972 | Gauchet | 280/709 |
| 4,386,791 | 6/1983 | Watanabe | 280/707 |
| 4,396,202 | 8/1983 | Kami | 280/714 |
| 4,462,610 | 6/1984 | Saito | 280/707 |

FOREIGN PATENT DOCUMENTS 53-26021 3/1978 Japan .
57-44509 3/1982 Japan ................................. 280/707

OTHER PUBLICATIONS

Totani, Shinzo, International Congress on Transportation Electronics Proceedings, Oct. 22–24, 1984, 111-37.

Primary Examiner—John J. Love
Assistant Examiner—Karin L. Ferriter
Attorney, Agent, or Firm—Frishauf, Holtz, Goodman & Woodward

[57] ABSTRACT

In a vehicle suspension apparatus, front and rear wheel suspension units respectively have air spring chambers. Air is supplied to predetermined air spring chambers from an air source through a supply control valve, and at the same time air is exhausted from remaining air spring chambers through an exhaust control valve. Three-directional valves are inserted between the respective air spring chambers and the exhaust control valve. One end of a front wheel communication path is connected to the front left wheel three-directional valve and the other end of the path is connected to the front right wheel three-directional valve. Similarly, one end of a rear wheel communication path is connected to the rear left wheel three-directional valve and the other end of the path is connected to the rear right wheel three-directional valve. The air passing through the supply control valve is supplied to the front wheel air spring chambers through the front wheel communication path or to the rear wheel air spring chambers through the rear wheel communication path. Each of the three-directional valves can take the first position where the air spring chambers communicate with the supply control valve or the second position where the air spring chambers communicate with the exhaust control valve, thereby decreasing the numbers of valves and paths so as to perform position control.

23 Claims, 14 Drawing Figures

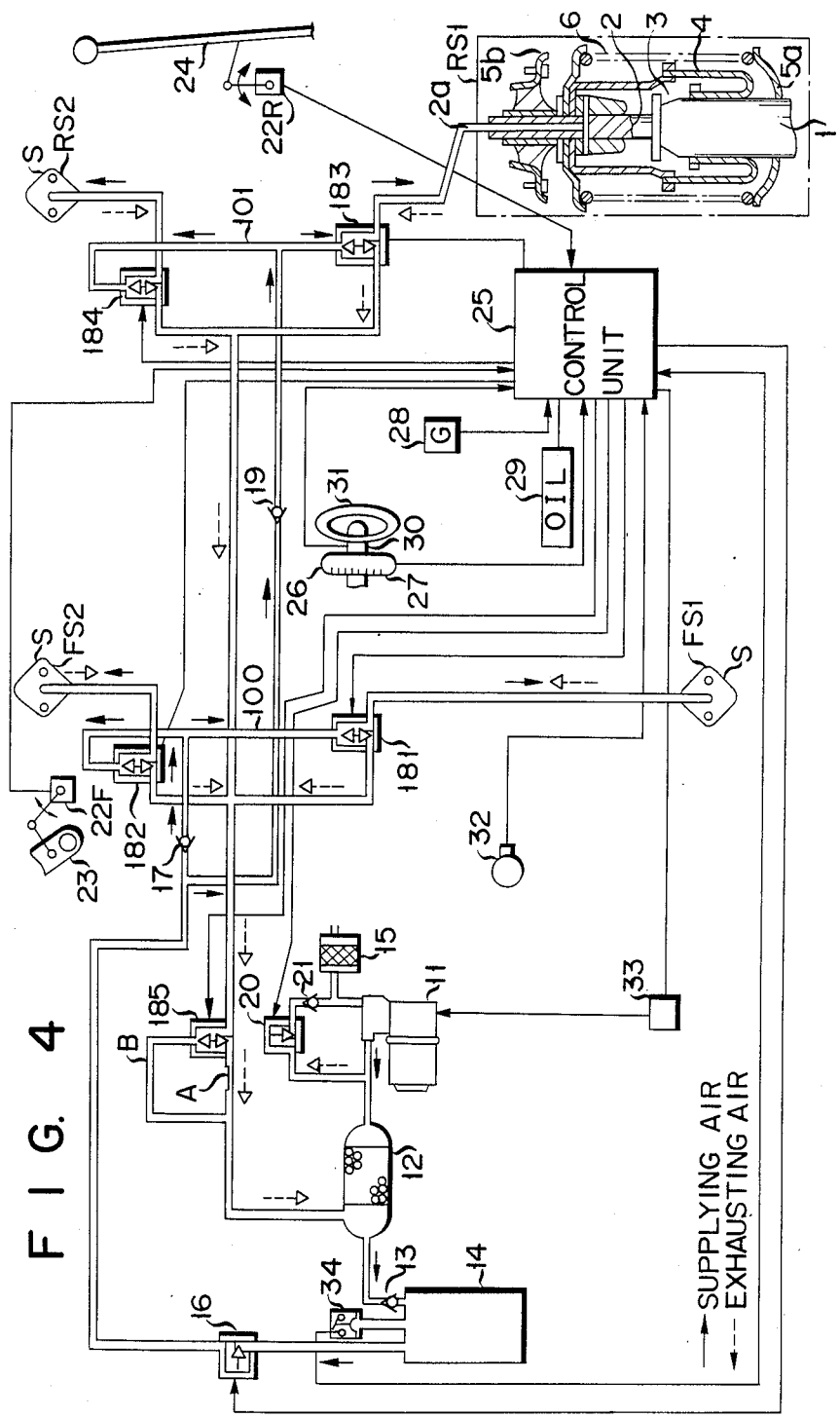

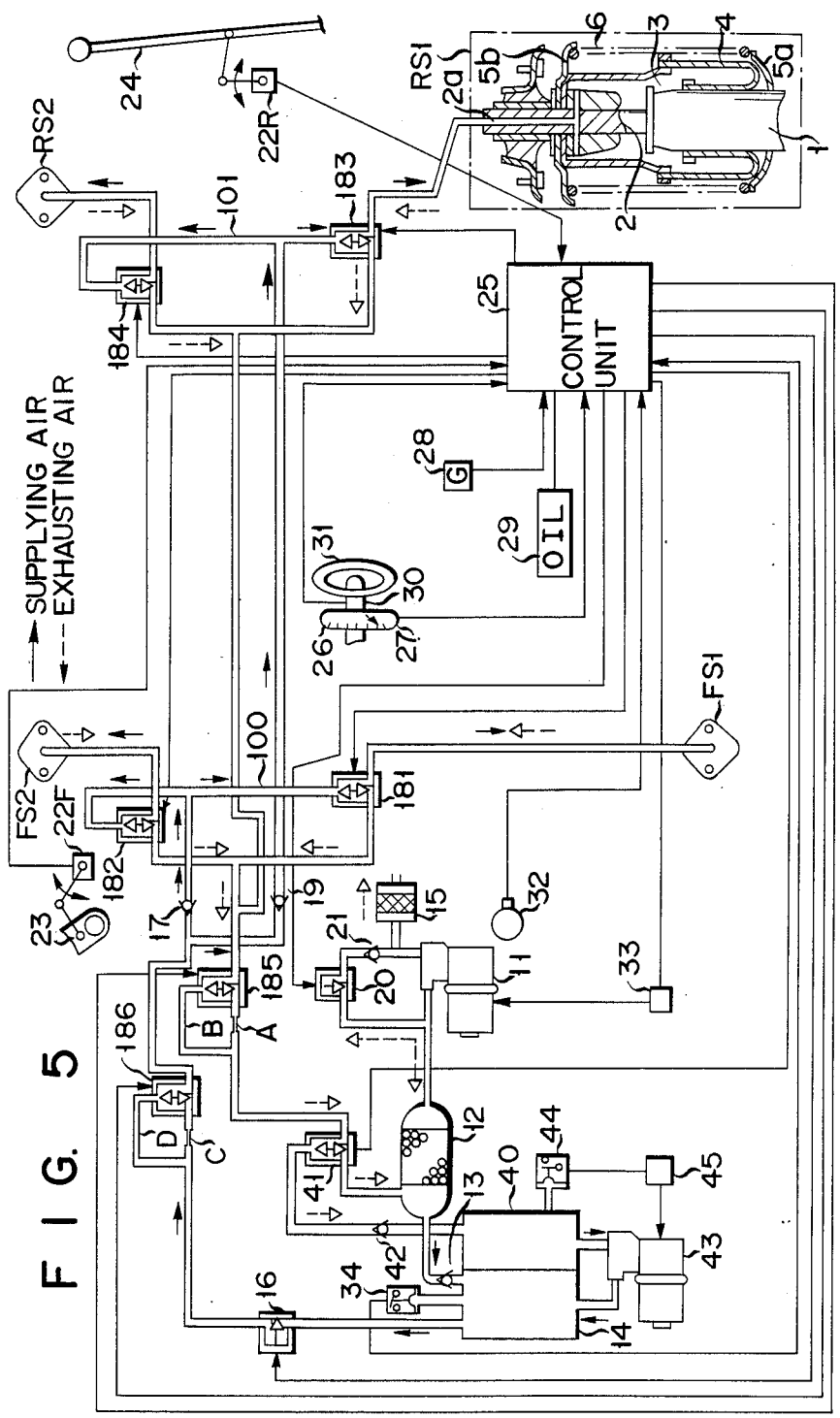

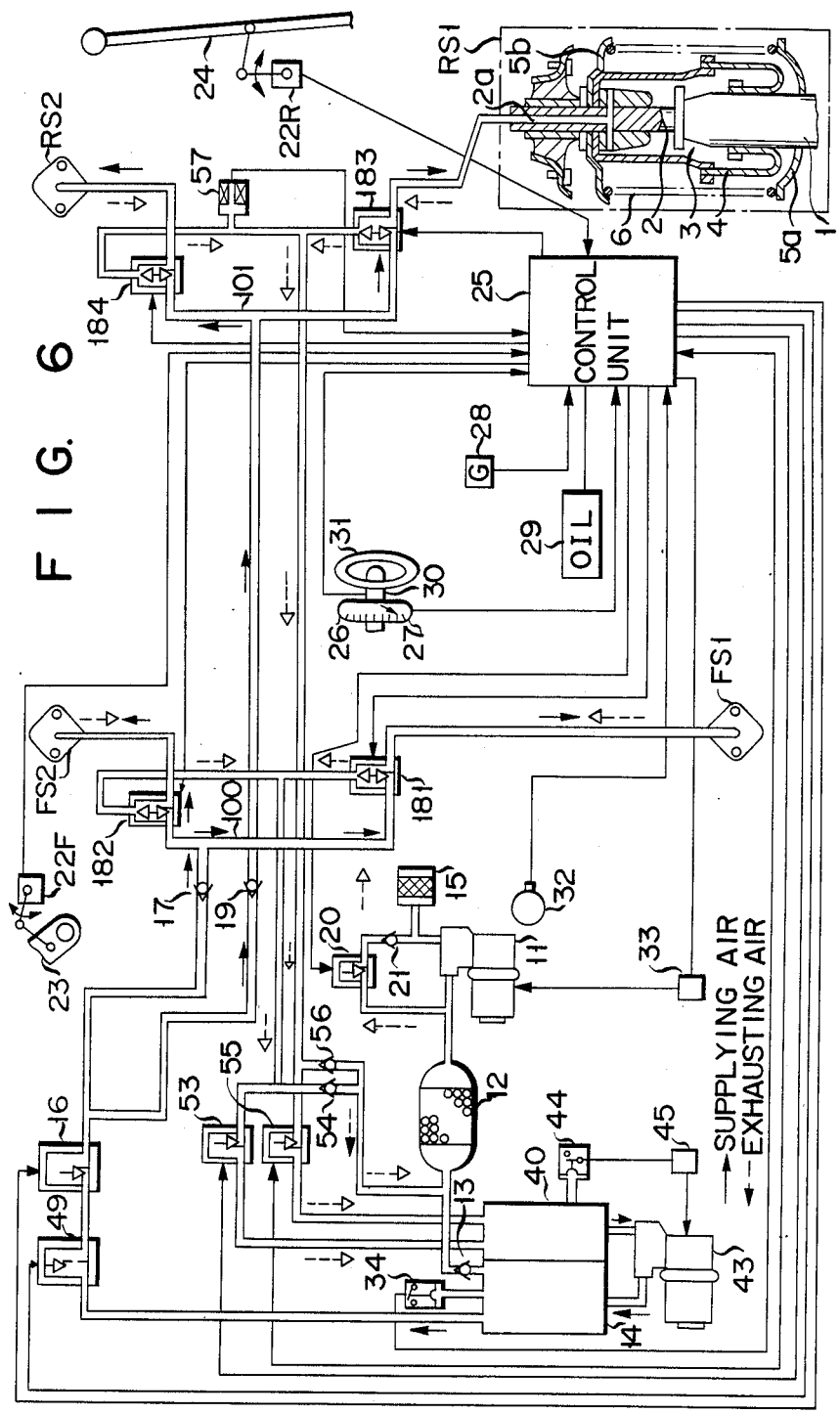

FIG. 8

| MODE | | 182 | 181 | 184 | 183 | 53 | 55 | 20 | 16 | 49 |
|---|---|---|---|---|---|---|---|---|---|---|
| POSITION CONTROL | RIGHT-TURN | | ○ | | ○ | ○ | ○ | | ○ | |
| | HOLD | | ○ | | ○ | | | | | |
| | LEFT-TURN | ○ | | ○ | | ○ | ○ | | ○ | |
| | HOLD | ○ | | ○ | | | | | | |
| | FRONT UP | ○ | ○ | | | | | | ○ | |
| | ↑ DOWN | | | | | | ○ | | | |
| | REAR UP | | | ○ | ○ | | | | ○ | |
| | ↑ DOWN | | | | | | ○ | | | |
| | F&R UP | ○ | ○ | ○ | ○ | | | | ○ | |
| | ↑ DOWN | | | | | ○ | ○ | | | |
| | F.UP-R.DOWN | ○ | ○ | | | | ○ | | ○ | |
| | R.UP-F.DOWN | | | ○ | ○ | ○ | | | ○ | |
| HEIGHT CONTROL | FRONT UP | ○ | ○ | | | | | | ○ | ○ |
| | ↑ DOWN | | | ○ | ○ | | | ○ | | |
| | REAR UP | | | ○ | ○ | | | | ○ | ○ |
| | ↑ DOWN | ○ | ○ | | | | | ○ | | |
| | F&R UP | ○ | ○ | ○ | ○ | | | | ○ | ○ |
| | ↑ DOWN | | | | | | | ○ | | |
| | F.UP-R.DOWN | ○ | ○ | | | | | ○ | ○ | ○ |
| | R.UP-F.DOWN | | | ○ | ○ | | | ○ | ○ | ○ |

FIG. 10

| MODE | | 182 | 181 | 184 | 183 | 53 | 55 | 20 | 51 | 52 | 49 |
|---|---|---|---|---|---|---|---|---|---|---|---|
| POSITION CONTROL | RIGHT-TURN | | ○ | | ○ | ○ | ○ | | ○ | ○ | |
| | HOLD | | ○ | | ○ | | | | | | |
| | LEFT-TURN | ○ | | ○ | | ○ | ○ | | ○ | ○ | |
| | HOLD | ○ | | ○ | | | | | | | |
| | FRONT UP | ○ | ○ | | | | | | ○ | | |
| | ↑ DOWN | | | | | | ○ | | | | |
| | REAR UP | | | ○ | ○ | | | | | ○ | |
| | ↑ DOWN | | | | | | | ○ | | | |
| | F & R UP | ○ | ○ | ○ | ○ | | | | ○ | ○ | |
| | ↑ DOWN | | | | | | ○ | ○ | | | |
| | F.UP-R.DOWN | ○ | ○ | | | | | ○ | ○ | | |
| | R.UP-F.DOWN | | | ○ | ○ | ○ | | | | ○ | |
| HEIGHT CONTROL | FRONT UP | ○ | ○ | | | | | | ○ | | ○ |
| | ↑ DOWN | | | ○ | ○ | | | ○ | | | |
| | REAR UP | | | ○ | ○ | | | | | ○ | ○ |
| | ↑ DOWN | ○ | ○ | | | | | ○ | | | |
| | F & R UP | ○ | ○ | ○ | ○ | | | | ○ | ○ | |
| | ↑ DOWN | | | | | | | ○ | | | |
| | F.UP-R.DOWN | ○ | ○ | | | | | ○ | ○ | | ○ |
| | R.UP-F.DOWN | | | ○ | ○ | | | ○ | | ○ | ○ |

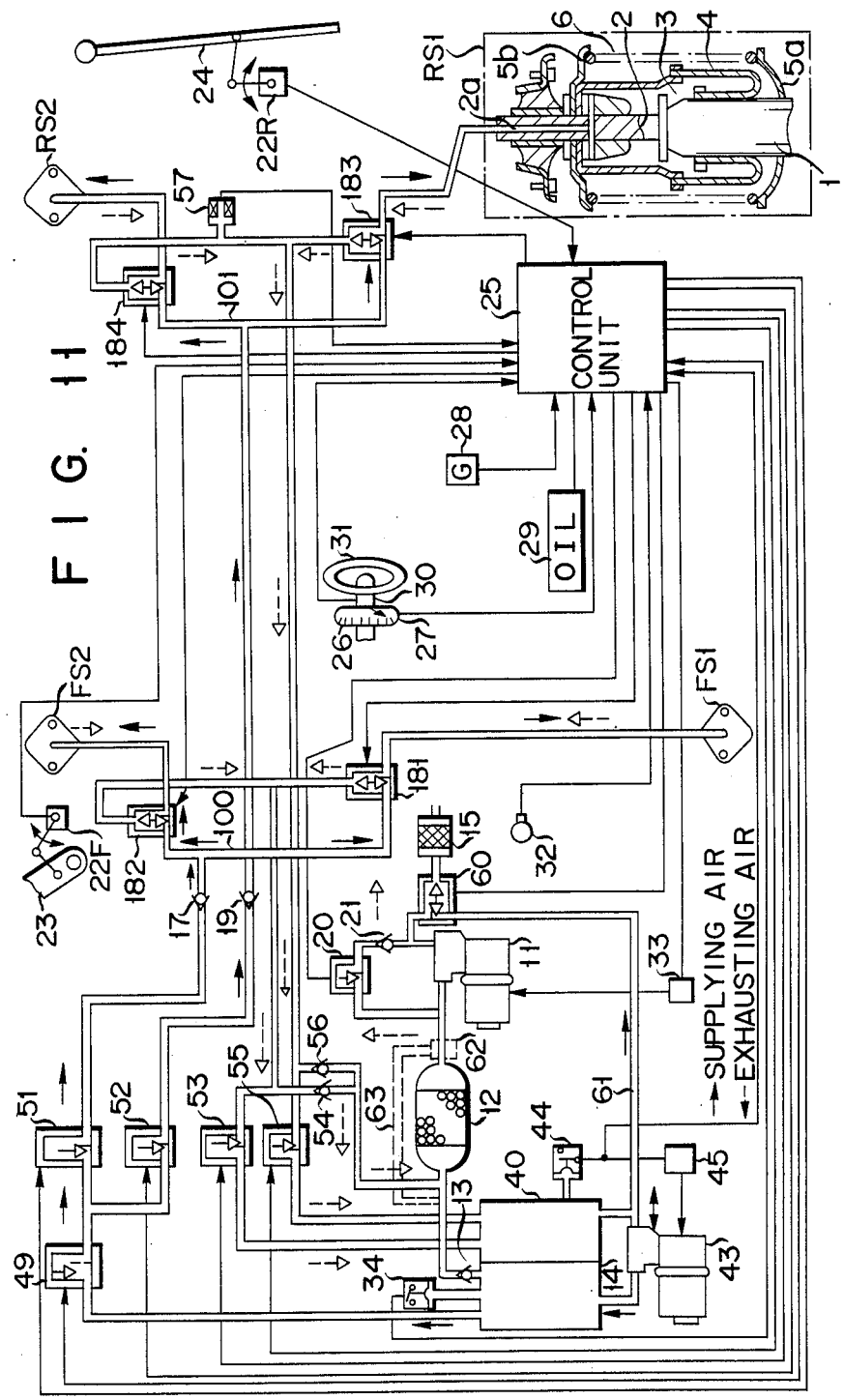

4,673,193

VEHICLE SUSPENSION APPARATUS

BACKGROUND OF THE INVENTION

The present invention relates to a vehicle suspension apparatus with a height control function for adjusting a vehicle height to a predetermined value and a position control function so as to forcibly correct changes (e.g., rolling and pitching displacements) in position of a body.

There is a way to control rolling of the vehicle body by providing fluid spring chambers in each of the wheels respectively. When the vehicle travels straight, the left wheel fluid spring chambers communicate with the right wheel fluid spring chambers to keep them at an identical pressure. However, when rolling control is to be performed, the left wheel fluid spring chambers are disconnected from the right wheel fluid spring chambers, and a predetermined volume of fluid is supplied to the fluid spring chambers which are contracted with respect to the rolling direction and at the same time a predetermined volume of fluid is exhausted from the fluid spring chambers which are extended, thereby controlling the rolling displacement of the vehicle body.

In order to achieve the above technique, mutual communication between the right and left fluid spring chambers and supply/exhaust of the fluid with respect to the corresponding spring chambers must be controlled. Therefore, the numbers of fluid paths and valves are increased, thereby complicating the control system.

SUMMARY OF THE INVENTION

It is an object of the present invention to solve said problem by decreasing the numbers of flow paths and valves.

In order to achieve the above object of the present invention, there is provided a vehicle suspension apparatus comprising: fluid spring chambers provided for front and rear wheels, respectively; fluid supply means for supplying a fluid to the fluid spring chambers from a fluid source through a supply control valve; fluid exhausting means for exhausting the fluid from the fluid spring chambers through an exhaust control valve; a front left wheel three-directional valve, a front right wheel three-directional valve, a rear left wheel three-directional valve and a rear right wheel three-directional valve which are inserted between the fluid spring chambers and the exhaust control valve, respectively; a front wheel communication path, one end of which is connected to the front left wheel three-directional valve and the other end of which is connected to the front right wheel three-directional valve; and a rear wheel communication path, one end of which is connected to the rear left wheel three-directional valve and the other end of which is connected to the rear right wheel three-directional valve, the fluid supply means being arranged such that the fluid passing through the supply control valve is supplied to the front wheel fluid spring chambers through the front wheel communication path and to the rear wheel spring chambers through the rear wheel communication path, and each of the three-directional valves being located in a first position where the fluid spring chambers communicate with the corresponding communication paths or in a second position where the fluid spring chambers communicate with the exhaust control valve, respectively.

BRIEF DESCRIPTION OF THE DRAWINGS

FIG. 4 is a diagram showing a vehicle suspension apparatus according to a second embodiment of the present invention;

FIG. 5 is a diagram showing a vehicle suspension apparatus according to a third embodiment of the present invention;

FIG. 6 is a diagram showing a vehicle suspension apparatus according to a fourth embodiment of the present invention;

FIG. 8 is a table showing the ON and OFF states of the respective valves in position and height control modes of the fourth embodiment;

FIG. 10 is a table showing the ON and OFF states of the respective valves in the position and height control modes; and FIG. 11 is a diagram showing a vehicle suspension apparatus according to a sixth embodiment of the present invention.

DETAILED DESCRIPTION OF THE PREFERRED EMBODIMENTS

The present invention will be described in detail with reference to the preferred embodiments taken in conjunction with the accompanying drawings.

Figure 1:
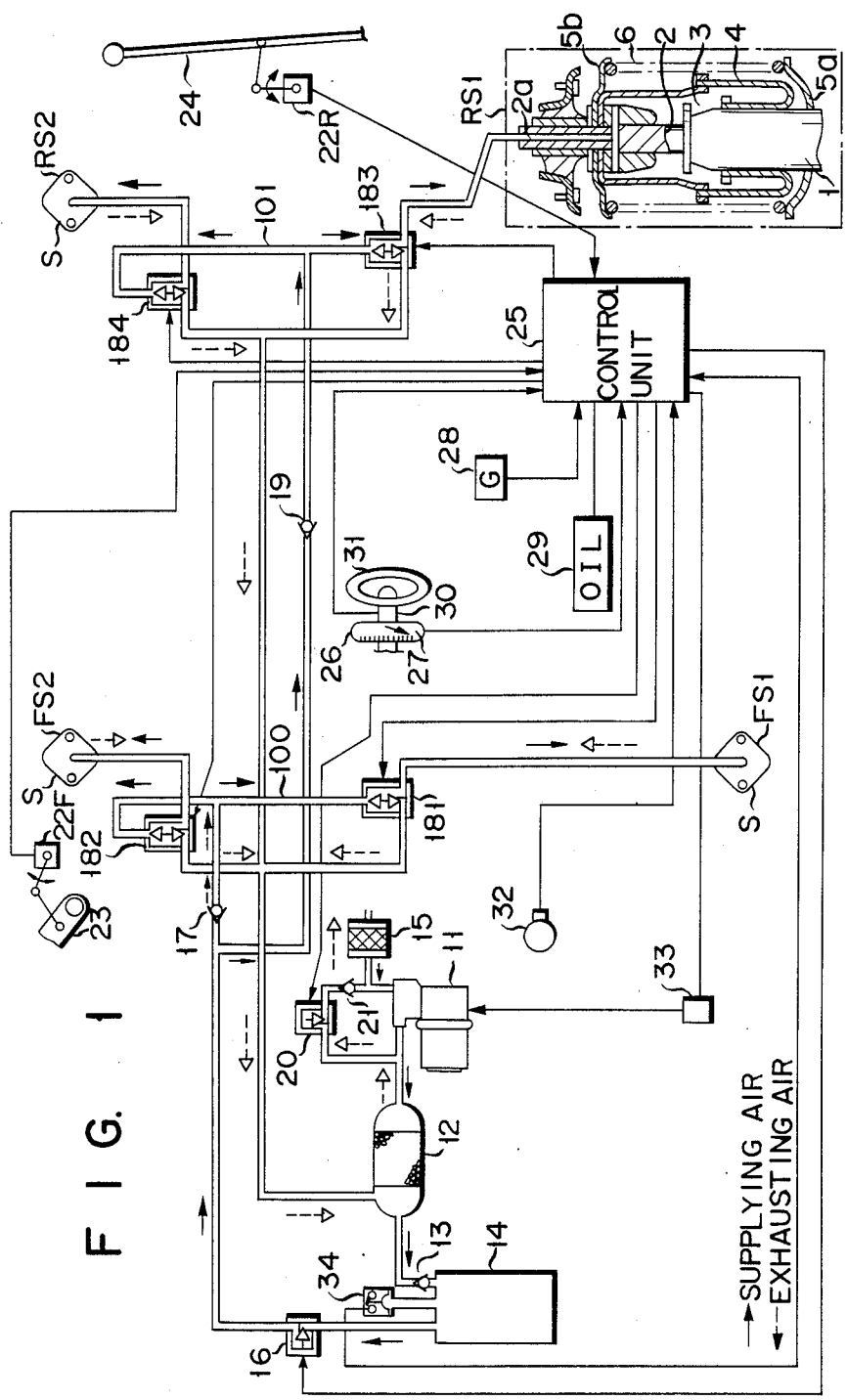
FIG. 1 is a diagram showing a vehicle suspension apparatus according to a first embodiment of the present invention.

FIGS. 1 to 3 show a vehicle suspension apparatus according to a first embodiment of the present invention. Referring to FIG. 1, reference symbol FS1 denotes a front left wheel suspension unit; FS2, a front right wheel suspension unit; RS1, a rear left wheel suspension unit; and RS2, a rear right wheel suspension unit. The units FS1, FS2, RS1 and RS2 have an identical structure. Excluding the cases wherein the front wheel suspension units must be distinguished from the rear wheel units and the left wheel suspension units must be distinguished from the right wheel units, the suspension units are represented by reference symbol S, and only the part associated with height control is illustrated for the following description.

Each suspension unit S comprises a strut type shock absorber 1. The absorber 1 comprises a cylinder mounted on the corresponding wheel, and a piston rod 2 which has a piston slidably fitted in the cylinder and an upper end supported by the body. The suspension unit S has an air spring chamber 3 mounted at the upper portion thereof. The chamber 3 has a height control function and is coaxial with the piston rod 2. Part of the chamber 3 is constituted by a bellows 4. Air is supplied to or exhausted from the chamber 3 through a path 2a formed in the piston rod 2, thereby moving the body upward or downward.

A spring seat 5a extends upward on an outer wall surface of the cylinder of the absorber 1. A spring seat 5b extends downward from the outer wall surface of the piston rod 2. A coil spring 6 is contracted between the seats 5a and 5b. It should be noted that the coil spring 6 supports part of the sprung mass, i.e., the body.

A circuit for supplying air to or exhausting it from the chamber 3 of each unit S will be described. Compressed air produced by a compressor 11 as a compressed air generator is stored in a reserve tank 14 through a drier 12 and a check valve 13. In other words, the compressor 11 compresses the air received from an air cleaner 15 and supplies the compressed air to the drier 12. The compressed air is dried by silica gel or the like in the drier 12, and the dried compressed air is stored in the tank 14.

The air is supplied from the tank 14 to the respective units S in a direction indicated by the solid arrows in FIG. 1. More particularly, the compressed air in the tank 14 is supplied to the units FS1 and FS2 through an air supply solenoid valve 16, a check valve 17 and three-directional valves 181 and 182. Similarly, the compressed air is supplied from the tank 14 to the units RS1 and RS2 through the valve 16, a check valve 19 and three-directional valves 183 and 184. Reference numeral 100 denotes a front wheel communication path, one end of which is connected to the valve 181 and the other end of which is connected to the valve 182. Reference numeral 101 denotes a rear wheel communication path, one end of which is connected to the valve 183 and the other end of which is connected to the valve 184.

The air is exhausted from the respective units S in a direction indicated by the broken arrows in FIG. 1. More specifically, the compressed air in the units FS1 and FS2 is exhausted through the valves 181 and 182, the path 100, the drier 12, an air exhaust solenoid valve 20, a check valve 21 and the air cleaner 15. Similarly, the compressed air in the units RS1 and RS2 is exhausted through the valves 183 and 184, the path 101, the drier 12, the valves 20 and 21, and the air cleaner 15.

Figure 2A:
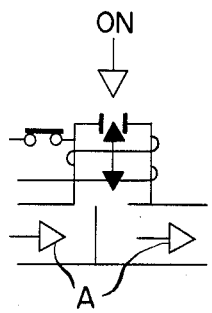
FIGS. 2A and 2B are diagrams showing the ON and OFF states of each of three-directional valves 181 to 184 in the apparatus of the first embodiment, respectively.
Figure 2B:
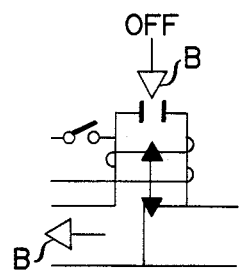
Figure 3A:
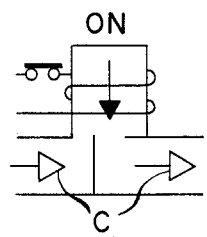
FIGS. 3A and 3B are diagrams showing the ON and OFF states of each of an air intake valve 16 and an air exhaust valve 20 in the apparatus of the first embodiment, respectively.
Figure 3B:
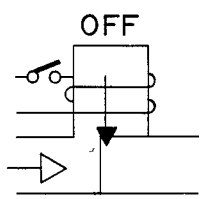

When each of the valves 181, 182, 183 and 184 is turned on (energized), air flows in the direction indicated by arrow A, as shown in FIG. 2A. However, when the valve is turned off (deenergized), air flows in the direction indicated by arrow B, as shown in FIG. 2B. When each of the valves 16 and 20 is turned on (energized), air flows in the direction indicated by arrow C, as shown in FIG. 3A. However, when this valve is turned off (deenergized), air flows in the direction indicated by arrow D, as shown in FIG. 3B, thereby stopping the air flow.

Reference numeral 22F denotes a front height sensor mounted between a lower arm 23 of the front right suspension unit and the body to detect a front height; and 22R, a rear height sensor mounted between a lateral rod 24 of the rear left suspension unit and the body to detect a rear height. Signals generated from the sensors 22F and 22R are supplied to a control unit 25 having a microcomputer. It should be noted that each of the sensors 22F and 22R comprises a Hall IC element and a magnet, one of which is mounted on the wheel side and the other of which is mounted on the body so as to detect a difference between a current height and a normal height level, low height level or high height level.

The height sensors can be of another type, e.g., a sensor using a phototransistor.

Reference numeral 27 denotes a vehicle velocity sensor built into a speedometer 26. A velocity signal is supplied from the sensor 27 to the control unit 25. The sensor 27 can comprise a mechanical speedometer (e.g., a lead switch type speedometer) or an electronic speedometer (e.g., an open collector output type speedometer).

Reference numeral 28 denotes an acceleration (G) sensor for detecting an acceleration acting on the body. The sensor 28 detects accelerations of pitching, rolling and yaw directions in the sprung mass, i.e., the body. The sensor 28 has a structure wherein a weight is vertically suspended and a light-shielding plate interlocked with the weight shields light from a light-emitting diode when no acceleration acts on the body, thereby detecting the presence/absence of the acceleration. When an acceleration acts on the body, the weight is inclined to pass the light from the light-emitting diode to a light-receiving element. A signal from the sensor 28 is supplied to the control unit 25.

Reference numeral 29 denotes an indicator (OIL) for indicating a hydraulic pressure of an engine (not shown); 30, a steering sensor for detecting a rotational velocity (i.e., a steering angular velocity) of a steering wheel 31; and 32, an accelerator pedal depression sensor for detecting a depression angle of the accelerator pedal. Signals from the sensors 29, 30 and 32 are supplied to the unit 25.

Reference numeral 33 denotes a compressor relay for driving the compressor 11. The relay 33 is controlled by a control signal supplied from the unit 25. Reference numeral 34 denotes a pressure switch which is turned on when a pressure in the tank 14 is decreased below a predetermined value. A signal from the switch 34 is supplied to the unit 25. When the pressure in the tank 14 is decreased below the predetermined value and the switch 34 is turned on, the unit 25 supplies a control signal to the compressor 11 which is then driven, thereby maintaining the pressure in the reserve tank 14 at the predetermined value.

The valves 16, 20 and 181 to 184 are controlled in response to control signals supplied from the unit 25.

The operation of the vehicle suspension apparatus having the configuration described above will be described hereinafter.

The height control function will be first described. The control unit 25 reads outputs from the sensors 22F and 22R every 6 ms. These outputs are added $2^8$ times. The accumulated value is averaged to obtain an average height (to be referred to as a 1.5-sec average value hereinafter) for 1.5 sec. Although 6 ms $\times 2^8 = 1,536$ ms, the total time interval is given as 1.5 sec for simplicity. The current height is discriminated as falling within one of the regions (neutral, high and low). This determination is continued to determine which region includes N (N is determined in accordance with the driving conditions) consecutive 1.5-sec average values. For example, when the height is continuously detected to be a high or low height level for 30 seconds while the vehicle is traveled, that is, when 20 1.5-sec average values are detected to be in the high or low height region, height control (to be described later) is started. When the control unit 25 detects that the 1.5-sec average values are detected as representing the neutral height level, height control is stopped.

All the valves are turned off while the vehicle normally travels straight, and no air supply/exhaust is performed. The right suspension units communicate with the left suspension units to keep all the air spring chambers at an identical pressure.

Height control modes will be described in detail. When the height is kept below the neutral height level for 30 seconds, the valve 16 is opened in response to the control signal from the unit 25. In this case, the valves 181 to 184 are not energized and remain in the state shown in FIG. 2B. For this reason, the compressed air supplied from the tank 14 is supplied to the chambers 3 of the units FS1 and FS2 through the valves 16 and 17 and the valve 181 or 182. At the same time, the compressed air supplied from the tank 14 is supplied to the chambers 3 of the units RS1 and RS2 through the valves 16 and 19 and the valve 183 or 184. The front and rear heights are increased. As described above, when the 1.5-sec average value represents the neutral height level, the valve 16 is closed in response to the control signal supplied from the unit 25, thereby stopping the height control.

When the average height for 30 seconds is higher than the neutral height level, the valves 20 and 181 to 184 are driven in response to the control signal from the unit 25. The valve 20 is opened, and the valves 181 to 184 are energized to change into the state shown in FIG. 2A. For this reason, part of the compressed air in the air spring chambers of the units FS1, FS2, RS1 and RS2 is exhausted in air through the valves 181 to 184, the drier 12, the valves 20 and 21 and the cleaner 15, thereby decreasing the front and rear heights. As described above, when the 1.5-sec average value represents the neutral height level, the valves 20 and 181 to 184 are turned off in response to the control signal from the unit 25, thereby stopping the height control.

A position control mode will be described when the steering wheel 31 is turned to the right (clockwise) or to the left (counterclockwise). When the driver turns the steering wheel 31 to the right, the body tends to roll in the left direction. The unit 25 energizes the valves 16 and 20 and also energizes the right three-directional valves 182 and 184. When a predetermined period of time has elapsed, the unit 25 closes valves 16 and 20. As a result, the compressed air is supplied to the chambers 3 of the left suspension units FS1 and RS1 in a predetermined volume. At the same time, the compressed air is exhausted from the chambers 3 of the right suspension units FS2 and RS2 in a predetermined volume, thereby correcting a rolling displacement of the body to the left. Then this control mode is continued, i.e., the compressed air is supplied to the chambers 3 of the units FS1 and RS1 in the predetermined volume, and the air is exhausted from the chambers 3 of the units FS2 and RS2 in the predetermined volume. When the right-turn state is changed to straight drive state and the unit 25 determines that the neutral steering position is detected by the sensor 30, the valves 182 and 184 are turned off. Therefore, the air spring chambers of the left suspension units have the same pressure as those of the right suspension units.

When the driver turns the steering wheel 31 to the left, the body tends to roll in the right direction. The unit 25 opens the valves 16, 20, 181 and 183. When a predetermined period of time has elapsed, the unit 25 closes valves 16 and 20. As a result, the compressed air is supplied to the chambers 3 of the right suspension units FS2 and RS2 in a predetermined volume, and at the same time, the compressed air is exhausted from the chambers 3 of the left suspension units FS1 and RS1 in a predetermined volume, thereby correcting a rolling displacement of the body to the right. The subsequent operation is the same as in the case wherein the steering wheel 31 is turned to the right.

Nose dive control will be described wherein a negative acceleration (i.e., deceleration) acts on the body to move the front portion of the body downward when the driver depresses the brake pedal. When the driver actually depresses the brake pedal, a brake sensor (not shown) detects depression of the brake pedal. The unit 25 opens the valves 16 and 20 and the rear threedirectional valves 183 and 184 for a predetermined period of time (e.g., about 0.2 sec). The compressed air is supplied to the units FS1 and FS2 in a predetermined volume, and at the same time the compressed air is exhausted from the units RS1 and RS2 in a predetermined volume, thereby correcting the nose dive. This control mode is continued until the negative acceleration is decreased. When the sensor 28 detects that the negative acceleration is less than a predetermined level, and the sensor 27 detects that the vehicle is stopped, the unit 25 opens the valves 16, 20, 181 and 182 for the predetermined period of time. The compressed air is exhausted from the units FS1 and FS2, and at the same time the compressed air is supplied to the units RS1 and RS2, thereby restoring the previous state of the air spring chambers which is maintained before nose dive control is performed.

A squat control mode will be described wherein the front portion of the body is moved upward when the driver rapidly depresses the acceleration pedal. When a large acceleration is detected by the sensor 32, the unit 25 opens the valves 16, 20, 181 and 182 for a predetermined period of time (e.g., about 0.2 sec). The compressed air is exhausted from the front suspension units FS1 and FS2 in a predetermined volume, and at the same time the compressed air is supplied to the rear suspension units RS1 and RS2 in a predetermined volume, thereby correcting the squat effect. This mode is continued until the large acceleration is decreased to a predetermined level. When the sensor 32 or the like detects that the large acceleration is decreased to the predetermined level, the unit 25 opens the valves 16, 20, 183 and 184 for a predetermined period of time. The compressed air is supplied to the units FS1 and FS2 in a predetermined volume, and at the same time the compressed air is exhausted from the units RS1 and RS2 in a predetermined volume. Therefore, the air spring chambers of the units S restore the previous state which was maintained before the squat control mode was set.

It is possible to use a damping force switching type shock absorber or a spring force switching air spring may be used together with each unit S to increase the damping or spring force in the position control mode.

As is apparent from the above description, according to the first embodiment, the height control mode and different position control modes can be performed by selectively using the valves 16, 20, and 181 to 184. The number of valves is decreased to decrease the number of pipes, thereby providing a simple vehicle suspension apparatus.

A vehicle suspension apparatus according to a second embodiment of the present invention will be described with reference to FIG. 4.

The apparatus of the second embodiment is substantially the same as that of the first embodiment except that the compressed air in air spring chambers 3 in suspension units S are exhausted through a three-directional valve 185 and a small-diameter path A or a large-diameter path B. The valve 185 selects one of the small- and large-diameter paths A and B. The valve 185 has the same construction as that of each of the valves 181 to 184 and is controlled in response to a control signal from a control unit 25.

The same reference numerals in FIG. 4 denote the same parts as in FIG. 1, and a detailed description thereof will be omitted.

The operation of the apparatus of the second embodiment is substantially the same as that of the first embodiment. However, the unit 25 controls the valve 185 in the following manner. In the position control mode, the unit 25 deenergizes the valve 185 to exhaust the compressed air from the chambers 3 of the corresponding units S through the path B, thereby performing a position control mode which requires a higher exhaust rate of the compressed air per unit time. When the height control mode is set, the unit 25 energizes the valve 185 to exhaust the compressed air from the chambers 3 of the corresponding units S through the path A, thereby performing a height control mode requiring a low exhaust rate of the compressed air per unit time. Therefore, height control hunting caused by height control overshooting and discomfort of the passengers can be prevented.

In the second embodiment, the small-diameter path A and the large-diameter path B bypassing the path A are formed in the exhaust channel. However, a small-diameter path and a large-diameter path bypassing the small-diameter path may also be formed between the valve 16 and the valves 17 and 19. In this case, when the unit 25 performs position control, the compressed air is supplied to the air spring chambers of the units S through the large-diameter path. However, when the unit 25 performs height control, the compressed air is supplied to the air spring chambers of the units S through the small-diameter path.

A vehicle suspension apparatus according to a third embodiment of the present invention will be described with reference to FIG. 5.

The third embodiment differs from the second embodiment shown in FIG. 4 in the following respects.

First, the compressed air is supplied to each unit S through a three-directional valve 186 and a small- or large-diameter path C or D. The valve 186 selects one of the small- and large-diameter paths C and D. The valve 186 has the same construction as that of the valve 185 and is controlled in response to the control signal from a control unit 25.

Second, a low-pressure reserve tank 40 is provided in addition to the tank 14. The compressed air is exhausted from the units S to the tank 40 through a three-directional valve 41 and a check valve 42 which are arranged in the exhaust path. When the valve 41 is deenergized, the compressed air is exhausted in the tank 40. However, when the valve 41 is energized, the compressed air is exhausted in the valve 20 through the drier 12.

Third, a compressor 43 is provided in addition to the compressor 11. The intake port of the compressor 43 is connected to the tank 40, and the delivery port thereof is connected to the tank 14. The compressor 43 is controlled by a pressure switch 44 for generating a signal when the pressure in the tank 40 exceeds a predetermined value (e.g., an atmospheric pressure) and a compressor relay 45 which receives the signal from the switch 44 to drive the compressor 43.

The same reference numerals as in FIG. 5 denote the same parts as in the second embodiment of FIG. 4, and a detailed description thereof will be omitted.

The operation of the third embodiment is substantially the same as that of the second embodiment. When the unit 25 peforms a position control mode which requires a large supply/exhaust rate of the compressed air per unit time, the unit 25 deenergizes the valves 185, 186 and 41. The compressed air is supplied to air spring chambers 3 of predetermined suspension units S through the path D, and at the same time the compressed air is exhausted from the chambers 3 of the remaining units S through the path B. The exhausted air is supplied to the tank 40 through the valves 41 and 42. When the control unit 25 performs a height increase mode requiring a low supply rate of the compressed air per unit time, the unit 25 energizes the valves 185, 186 and 41. The compressed air is supplied to the air spring chambers of the corresponding units S through the path C. When the unit 25 performs a height decrease mode, the compressed air is exhausted from the chambers 3 of the corresponding units S through the path A. The compressed air is also exhausted in atmospheric air through the valve 41, the drier 12, the valve 20, the valve 21 and the air cleaner 15.

According to the third embodiment in the same manner as in the second embodiment, in the position control mode, the compressed air is supplied to the chambers 3 of the predetermined units S through the path D, and at the same time the compressed air is exhausted from the chambers 3 of the remaining units S through the path B, thereby achieving air supply/exhaust at a high rate which is required in the position control mode. As a result, the rapid posture change can be properly controlled. When the height control mode is set, the compressed air is supplied through the path C and exhausted through the path A, thereby decreasing the flow rate of the compressed air supplied to or exhausted from the chambers per unit time, thereby preventing height control hanching caused by overshooting and decreasing discomfort of the passengers.

In addition, the following effect can also be obtained by the third embodiment. The atmospheric air is supplied and the compressor 11 is driven only when the pressure in the tank 14 is decreased below the predetermined value. No atmospheric air is received in the position control modes which are frequently set. Even if the position control modes are frequently set, the drier 12 is not substantially used, thereby prolonging the life of the drier 12. The air must slowly flow through the drier in order to regenerate the drier 12. In the height decrease mode, the exhausted air slowly passes through the drier 12, thereby sufficiently regenerating the drier 12.

According to the third embodiment, since the predetermined value represented by the signal from the switch 44 is set at the atmospheric pressure and the pressure in the tank 40 is less than the atmospheric pressure, the air from each unit S can be effectively supplied to the tank 40. However, the predetermined value represented by the signal from the switch 44 may be set to be higher than the atmospheric pressure. Even in this case, the same effect as in the above embodiment can be obtained.

A vehicle suspension apparatus according to a fourth embodiment of the present invention will be described with reference to FIG. 6.

The apparatus of the fourth embodiment differs from that of the third embodiment of FIG. 5 in the following points.

Figure 7A:
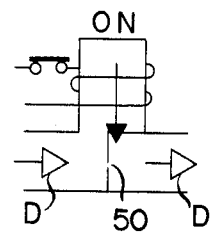
FIGS. 7A and 7B are diagrams showing the ON and OFF states of a flow control valve 49 in the apparatus of the fourth embodiment, respectively.
Figure 7B:
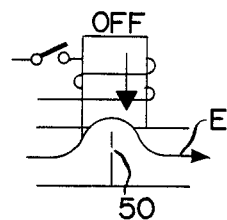

First, a supply air flow control valve 49 is provided in place of the paths C and D and the valve 186. When the valve 49 is turned on (energized), the air flows through an orifice 50 in a direction indicated by arrow D, as shown in FIG. 7A. However, when the valve 49 is turned off (deenergized), the air flows through a large-diameter path and the orifice 50 in a direction indicated by arrow E, as shown in FIG. 7B. Therefore, when the valve 49 is energized, the air is supplied at a low flow rate. However, when the valve 49 is deenergized, the air is supplied at a high flow rate.

Second, the apparatus of the fourth embodiment has front and rear wheel exhaust solenoid valves 53 and 55 and check valves 54 and 56. The compressed air from the chambers 3 of the front wheel suspension units FS1 and FS2 is supplied to the tank 40 through the valve 53. If the valve 20 is opened, the compressed air is supplied to the drier 12 through the check valve 54. The compressed air from the chambers 3 of the rear wheel suspension units RS1 and RS2 is supplied to the tank 40 through the valve 55. If the valve 20 is opened, the compressed air is supplied to the drier 12 through the check valve 56.

Third, a pressure sensor 57 is arranged in a communication path for causing the chamber 3 of the unit RS1 to communicate with that of the unit RS2 to detect a pressure of the chambers 3 thereof. A detection signal from the sensor 57 is supplied to the control unit 25.

Figure 9:
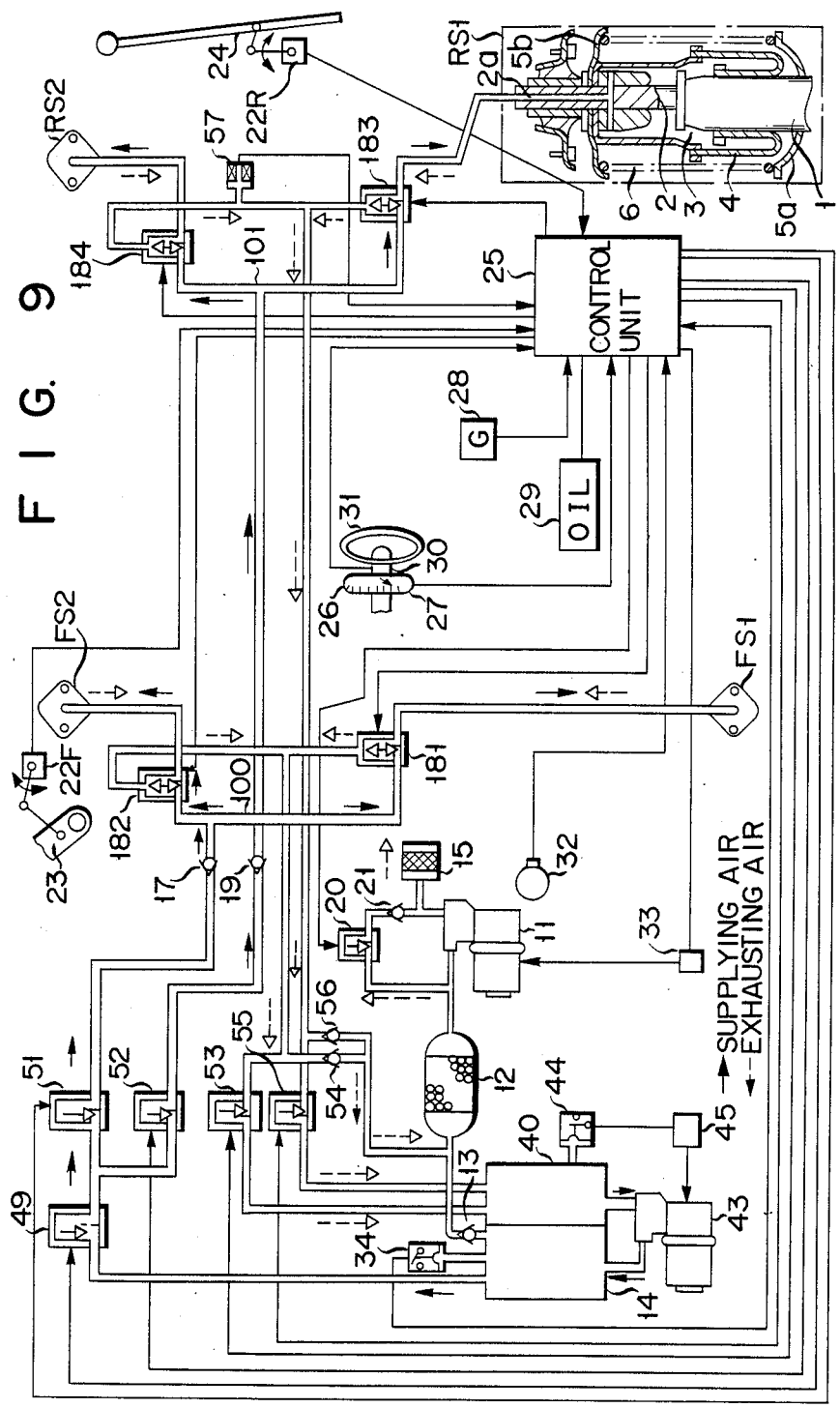
FIG. 9 is a diagram showing a vehicle suspension apparatus according to a fifth embodiment of the present invention.

Fourth, the way how each of the valves 181-184 in FIGS. 6, 9, 11 is connected between the spring chambers and fluid exhausting means is different from the way used in the first to fourth embodiment.

The valves 49, 53 and 55 are controlled in response to the control signal from the unit 25. The ON and OFF of the respective valves in the height and position control modes are illustrated in FIG. 8.

The same reference numerals in FIG. 6 denote the same parts as in the third embodiment shown in FIG. 5, and a detailed description thereof will be omitted.

According to the fourth embodiment, the same effect as in the third embodiment can be obtained. In addition, the following effects can also be obtained. The compressed air in the chambers 3 of the units FS1 and FS2 is exhausted in the tank 40 through the valve 53. The compressed air in the chambers 3 of the units RS1 and RS2 is exhausted in the tank 40 through the valve 55. In the rolling control mode, the compressed air exhausted from the chamber of the unit FS1 or FS2 will not interfere with the compressed air exhausted from the unit RS1 or RS2. Therefore, in the rolling control mode, when the pressure of the chamber 3 of the unit RS1 or RS2 is higher than that of the unit FS1 or FS2, the air exhaust efficiency of the chamber 3 of the unit FS1 or FS2 will not be degraded.

According to the fourth embodiment, the valve 49 serves as a flow control means arranged in the supply path. However, a similar flow control valve can be arranged in the exhaust path, as needed.

A vehicle control apparatus according to a fifth embodiment of the present invention will be described with reference to FIG. 9.

The apparatus of the fifth embodiment differs from that of the fourth embodiment shown in FIG. 6 in the following point.

The compressed air is supplied to the chambers 3 of the front suspension units FS1 and FS2 through a front wheel supply solenoid valve 51 and a check valve 17. The compressed air is supplied to the chambers 3 of the rear wheel suspension units RS1 and RS2 through a rear wheel supply solenoid valve 52 and a check valve 19. These valves 51 and 52 are controlled in response to the control signal from the control unit 25.

The ON and OFF states of the respective valves in the height and position control modes are illustrated in FIG. 10.

The same reference numerals in FIG. 9 denote the same parts as in the fourth embodiment shown in FIG. 6, and a detailed description thereof will be omitted.

According to the fifth embodiment, the same effect as in the fourth embodiment can be obtained. In addition, the following effect can be obtained. The compressed air is supplied to the chambers 3 of the units FS1 and FS2 through the valve 51 and in the units RS1 and RS2 through the valve 52. The compressed air in the chambers 3 of the units FS1 and FS2 is exhausted in the tank 40 through the valve 53, and at the same time the compressed air in the chambers 3 of the units RS1 and RS2 is exhausted in the tank 40 through the valve 55. In the rolling control mode, the ON time of one of the valves 51 and 52 differs from that of one of the valves 53 and 55. The vehicle load is greatly changed in accordance with an increase/decrease of the number of passengers and hence the load acting on the rear wheels is greatly changed. When loads acting on the front and rear wheels are greatly changed, the ON time of the valve 51 preferably differs from that of the valve 52. The loads respectively acting on the front and rear wheels are estimated in accordance with an output from a pressure sensor 57. The ON time of the valve 51 is differentiated from that of the valve 52 in accordance with the estimation result. Similarly, the ON time of the valve 53 is differentiated from that of the valve 55. Therefore, optimal rolling control can be performed irrespective of different loads acting on the front and rear wheels.

Only the valve 49 is provided as the flow control means arranged in the supply path. However, a similar flow control valve may be arranged in the exhaust path, as needed.

A vehicle suspension apparatus according to a sixth embodiment of the present invention will be described with reference to FIG. 11.

The apparatus of the sixth embodiment differs from that of the fifth embodiment shown in FIG. 9 in the following respects.

A path 61 is provided to connect the intake port of the compressor 11 and the tank 40 through a threedirectional valve 60. The valve 60 takes a first position where the air cleaner 15 communicates with only the intake port of the compressor 11 or a second position where the intake port of the compressor 11 communicates with the tank 40. The valve 60 is controlled in response to the control signal from the control unit 25.

Second, an output signal from the switch 44 for the tank 40 is supplied to the unit 25.

According to the sixth embodiment, the same effect as in the fifth embodiment can be obtained. In addition, the following effect can also be obtained. When the pressure of the tank 40 is decreased below the predetermined value and the signal is generated from the switch 44, the compressor relay 45 drives the compressor 43. At the same time, the unit 25 supplies a control signal to the relay 33 so as to drive the compressor 11, thereby decreasing the load of the compressor 43 unlike the compressors of the third to fifth embodiments.

When the switch 44 detects that the pressure of the tank 40 is increased over the predetermined value even if a failure occurs in the compressor 43, the unit 25 causes the valve 60 to take the second position, thereby driving the compressor 11. As a result, normal position control function can be guaranteed.

When the valve 60 takes the second position and the compressor 11 is driven, the compressor 11 compresses and supplies the already dried air in the tank 40 to the tank 14. The compressed air delivered from the compressor 11 need not pass through the drier 12. Therefore, as indicated by the broken line in FIG. 12, a bypass path 63 can be formed through a threedirectional valve 62 to bypass the drier 12. In this case, the valve 62 takes a first position where the air delivered from the compressor 11 entirely passes through the drier 12 and a second position where the air delivered from the compressor 11 entirely passes through the path 63. In this manner, the dried air can bypass the drier 12, thereby decreasing the load of the compressor 11.

All the embodiments are exemplified by the vehicle suspension apparatuses having air spring chambers. However, the present invention is not limited to the vehicle suspension apparatus having air spring chambers, but can be extended to, for example, a vehicle suspension apparatus of a hydropneumatic type.

What is claimed is:

1. A vehicle suspension apparatus having at least position control function, comprising:

fluid spring chambers provided for front and rear wheels, respectively;

fluid supply means for supplying a fluid to said fluid spring chambers from a fluid source through a supply control valve;

fluid exhausting means for exhausting the fluid from said fluid spring chambers through an exhaust control valve;

a front left wheel three-direction valve, a front right wheel three-directional valve, a rear left wheel three-direction valve and a rear right wheel three-directional valve which are inserted between said fluid spring chambers and said exhaust control valve, respectively;

a front wheel communication path, one end of which is connected to said front left wheel three-directional valve and the other end of which is connected to said front right wheel three-directional valve;

a rear wheel communication path, one end of which is connected to said rear left wheel three directional valve and the other end of which is connected to said rear right wheel three-directional valve, said fluid supply means being arranged such that the fluid passing through said supply control valve is supplied to said front wheel fluid spring chambers through said front wheel communication path and to said rear wheel spring chambers through said rear wheel communication path, each of said three-directional valves being located in a first position where said fluid spring chambers communicate with the corresponding communication paths or in a second position where said fluid spring chambers communicate with said exhaust control valve, respectively;

a position change sensor for detecting a change in position of the body;

position control means for receiving a signal from said position change sensor and selectively generating position contorl signals to said supply control valve, said exhaust control valve and said three-directional valves so as to supply a predetermined amount of the fluid to the contracted fluid spring chambers and exhaust a predetermined amount of the fluid from the extended fluid spring chambers with respect to a position change direction;

height sensors for detecting front and rear heights of the vehicle; and height control means for receiving signals from said height sensors, comparing the received signals with target heights, and selectively generating height control signals to said supply control valve, said exhaust control valve and said three-directional valves so as to set current heights at the target heights, said fluid supply means including a supply path selector valve for selecting one of small- and large-diameter paths of the fluid to be supplied to said fluid spring chambers, said height control means controlling said supply path selector valve in said fluid supply means to select said small-diameter path when the height control signals are generated, and said position control means controlling said supply path selector valve in said fluid supply means to select said large-diameter path when the position control signal is generated.

2. An apparatus according to claim 1, wherein said height control means and said position control means comprise a control unit having a microcomputer.

3. An apparatus according to claim 1, wherein each of said three-directional valves comprises a solenoid valve which takes the first position upon deenergization thereof and the second position upon energization thereof.

4. An apparatus according to claim 1, wherein each of said supply and exhaust control valves comprises a solenoid valve which is closed upon deenergization thereof and is opened upon energization thereof.

5. An apparatus according to claim 1, wherein said fluid supply means comprises:

a front wheel check valve for preventing the fluid from flowing from said front left three-directional valve and said front right three-directonal valve to said fluid source;, and a rear wheel check valve for preventing the fluid from flowing from said rear left three-directional valve and said rear right three-directional valve to said fluid source, whereby the fluid will not flow between said front wheel fluid spring chambers and said rear wheel fluid spring chambers through said fluid supply means.

6. An apparatus according to claim 1, wherein said fluid exhausting means comprises:

a front wheel check valve for preventing the fluid from flowing into said front wheel fluid spring chambers; and a rear wheel check valve for preventing the fluid from flowing into said rear wheel fluid spring chamber, whereby the fluid will not flow between said front wheel fluid spring chambers and said rear wheel fluid spring chambers through said fluid exhausting means.

7. An apparatus according to claim 1, wherein said supply control valve comprises a front wheel supply open/close valve for controlling supply of the fluid to said front wheel fluid spring chambers and a rear wheel supply open/close valve for controlling supply of the fluid to said rear wheel fluid spring chambers.

8. An apparatus according to claim 1, wherein said exhaust control valve comprises a front wheel exhaust open/close valve for controlling exhaust of the fluid from said front wheel fluid spring chambers and a rear wheel exhaust open/close valve for controlling exhaust of the fluid from said rear wheel fluid spring chambers.

9. An apparatus according to claim 1, wherein said fluid exhausting means comprises an exhaust path selector valve for selecting one of small- and large-diameter paths of the fluid to be exhausted from said fluid spring chambers, said height control means controls said supply and exhaust path selector valves in said fluid supply and exhausting means to select said small-diameter paths when the height control signals are generated, and said position control means controls said supply and exhaust path selector valves in said fluid supply and exhausting means to select said large-diameter paths when it generates a position control signal.

10. A vehicle suspension apparatus having at least position control function, comprising:

air spring chambers provided for front and rear wheels, respectively;

air supply means for supplying air to said air spring chambers from an air source through a supply control valve;

air exhausting means for exhausting the air from said air spring chambers through an exhaust control valve;

a front left wheel three-directional valve, a front right wheel three-directional valve, a rear left wheel three-directional valve and a rear right wheel three-directional valve which are inserted between said air spring chambers and sdid exhaust control valve, respectively;

a front wheel communication path, one end of which is connected to said front left wheel three-directional valve and the other end of which is connected to said front right wheel three-directional valve;

a rear wheel communication path, one end of which is connected to said rear left wheel three directional valve and the other end of which is connected to said rear right wheel three-directional valve, said air supply means being arranged such that the air passing through said supply control valve is supplied to said front wheel fluid air chambers through said front wheel communication path and to said rear wheel spring chambers through said rear wheel communication path, each of said three-directional valves being located in a first position where said air spring chambers communicate with the corresponding communication paths or in a second position where said air spring chambers communicate with said exhaust control valve, respectively;

a position change sensor for detecting a change in position of the body;

position control reans for receiving a signal from said position change sensor and selectively generating position control signals to said supply control valve, said exhaust control valve and said three-directional valves so as to supply a predetermined amount of the air to the contracted air spring chambers and exhaust a predetermined amount of the air from the extended air spring chambers with respect to a position change direction;

height sensors for detecting front and rear heights of the vehicle; and height control means for receiving signals from said height sensors, comparing the received signals with target heights, and selectively generating height control signals to said supply control valve, said exhaust control valve and said three-directional valves so as to set current heights at the target heights, said air supply means including a supply path selector valve for selecting one of small- and large-diameter paths of the air to be supplied to said air spring chambers, said height control means controlling said supply path selector valve in said air supply means to select said small-diameter path when the height control signals are generated, and said position control means controlling said supply path selector valve in said air supply means to select said large-diameter path when the position control signal is generated.

11. An apparatus according to claim 10, wherein said air supply means comprises:

a compressor;

a high-pressure reserve tank for storing air compressed and delivered from said compressor; and a drier inserted between said compressor and said high-pressure reserve tank.

12. An apparatus according to claim 11 which further comprises:

a low-pressure reserve tank for storing the air exhausted from said air exhausting means; and another compressor, an intake port of which is connected to said low-pressure reserve tank and a delivery port of which is connected to said high-pressure reserve tank.

13. An apparatus according to claim 12, wherein said exhaust control valve comprises a front wheel exhaust open/close valve for controlling exhaust of the air from said front wheel air spring chambers and a rear wheel exhaust open/close valve for controlling exhaust of the air said rear wheel air spring chambers, the air passing through said front wheel exhaust open/close valve and the air passing through said rear wheel exhaust open/close valve being adapted not to interfere with each other and adapted to be supplied to said low-pressure reserve tank.

14. An apparatus according to claim 10, wherein said height control means and said position control means comprise a control unit having a microcomputer.

15. An apparatus according to claim 10, wherein each of said three-directional valves comprises a solenoid valve which takes the first position upon deenergization thereof and the second position upon energization thereof.

16. An apparatus according to claim 10, wherein each of said supply and exhaust control valves comprises a solenoid valve which is closed upon deenergization thereof and is opened upon energization thereof.

17. An apparatus according to claim 10, wherein said air supply means comprises:

a front wheel check valve for preventing the air from flowing from said front left three-directional valve and said front right three-directional valve to said air source; and a rear wheel check valve for preventing the air from flowing from said rear left three-directional valve and said rear right three-directional valve to said air source, whereby the air will not flow between said front wheel air spring chambers and said rear wheel air spring chambers through said air supply means.

18. An apparatus according to claim 10, wherein said air exhausting means comprises:

a front wheel check valve for preventing the air from flowing into said front wheel air spring chambers; and a rear wheel check valve for preventing the air from flowing into said rear wheel air spring chambers, whereby the air will not flow between said front wheel air spring chambers and said rear wheel air spring chambers through said air exhausting means.

19. An apparatus according to claim 10, wherein said supply control valve comprises a front wheel supply open/close valve for controlling supply of the air to said front wheel air spring chambers and a rear wheel supply open/close valve for controlling supply of the air to said rear wheel air spring chambers.

20. An apparatus according to claim 10, wherein said exhaust control valve comprises a front wheel exhaust open/close valve for controlling exhaust of the air from said front wheel air spring chambers and a rear wheel exhaust open/close valve for controlling exhaust of the air from said rear wheel air spring chambers.

21. An apparatus according to claim 10, wherein said fluid exhausting means comprises an exhaust path selector valve for selecting one of small- and large-diameter paths of the air to be exhausted from said air spring chambers, said height control means controls said supply and exhaust path selector valves in said fluid supply and exhausting means to select said small-diameter paths when the height control signals are generated, and said position control means controls said supply and exhaust path selector valves in said fluid supply and exhausting means to select said large-diameter paths when it generates a position control signal.

22. A hydropneumatic type vehicle suspension apparatus having at least position control function comprising:

fluid spring chambers provided for front and rear wheels, respectively;

fluid supply means for supplying a fluid to said fluid spring chambers from a fluid source through a supply control valve;

fluid exhausting means for exhausting the fluid from said fluid spring chambers through an exhaust control valve;

a front left wheel three-directional valve, a front right wheel three-directional valve, a rear left wheel three-directional valve and a rear right wheel three-directional valve which are inserted between said fluid spring chambers and said exhaust control valve, respectively;

a front wheel communication path, one end of which is connected to said front left wheel three-directional valve and the other end of which is connected to said front right wheel three-directional valve;

a rear wheel communication path, one end of which is connected to said rear left wheel directional valve and the other end of which is connected to said rear right wheel three-directional valve, said fluid supply means being arranged such that the fluid passing through said supply control valve is supplied to said front wheel fluid spring chambers through said front wheel communication path and to said rear wheel spring chambers through said rear wheel communication path, each of said three-directional valves being located in a first position where said fluid spring chambers communicate with the corresponding communication paths or in a second position where said fluid spring chambers communicate with said exhaust control valve, respectively;

a position change sensor for detecting a change in position of the body;

position control means for receiving a signal from said position change sensor and selectively generating position control signals to said supply control valve, said exhaust control valve and said three-directional valves so as to supply a predetermined amount of the fluid to the contracted fluid spring chambers and exhaust a predetermined amount of the fluid from the extended fluid spring chambers with respect to a position change direction;

height sensors for detecting front and rear heights of the vehicle; and height control means for receiving signals from said height sensors, comparing the received signals with target height, and selectively generating height control signals to said supply valve, said exhaust control valve and said three-directional valves so as to set current heights at the target heights, said fluid supply means including a supply path selector valve for selecting one of small- and large-diameter paths of the fluid to be supplied to said fluid spring chambers, said height control means controlling said supply path selector valve in said fluid supply means to select said small-diameter path when the height control signals are generated, and said position control means controlling said supply path selector valve in said fluid supply means to select said large-diameter path when the position control signal is generated.

23. An apparatus according to claim 22, wherein said fluid exhausting means comprises an exhaust path selector valve for selecting one of small- and large-diameter paths of the fluid to be exhausted from said fluid spring chambers, said height control means controls said supply and exhaust path selector valves in said fluid supply and exhausting means to select said small-diameter paths when the height control signals are generated, and said position control means controls said supply and exhaust path selector valves in said fluid supply and exhausting means to select said large-diameter paths when it generates a position control signal.

* * * * *

UNITED STATES PATENT AND TRADEMARK OFFICE
CERTIFICATE OF CORRECTION

PATENT NO. : 4,673,193

DATED : June 16, 1987

INVENTOR(S) : Kobayashi et al

It is certified that error appears in the above-identified patent and that said Letters Patent is hereby corrected as shown below:

Title page:

In the Foreign Application Priority Data:

"July 25, 1985." should read -- July 25, 1984 --

"60-112664(U)" should read -- 59-112664(U) --.

Signed and Sealed this

Twelfth Day of January, 1988

*Attest:*

DONALD J. QUIGG

*Attesting Officer*  *Commissioner of Patents and Trademarks*